United States Patent
Aoki (10) Patent No.: US 10,825,144 B2
(45) Date of Patent: Nov. 3, 2020

(54) IMAGE PROCESSING APPARATUS AND IMAGE PROCESSING METHOD

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 16/028,667

(22) Filed: Jul. 6, 2018

(65) Prior Publication Data

US 2019/0019273 A1    Jan. 17, 2019

(30) Foreign Application Priority Data

Jul. 13, 2017   (JP) .................................. 2017-137132

(51) Int. Cl.
```
G06T 5/00       (2006.01)
G06K 9/40       (2006.01)
G06K 9/00       (2006.01)
```
(52) U.S. Cl.
CPC ................ *G06T 5/002* (2013.01); *G06K 9/40* (2013.01); *G06K 9/00375* (2013.01); *G06K 2009/00932* (2013.01); *G06T 2207/10024* (2013.01)

(58) Field of Classification Search
CPC . G06T 5/002; G06T 2207/10024; G06K 9/40; G06K 2009/00932; G06K 9/00375
See application file for complete search history.

(56) References Cited

U.S. PATENT DOCUMENTS

| 9,495,576 | B2* | 11/2016 | Aoki | G06K 9/00033 |
| 2003/0206245 | A1* | 11/2003 | Lin | G06T 5/50 348/631 |
| 2005/0206850 | A1* | 9/2005 | Shimizu | G03B 21/18 353/55 |
| 2007/0273686 | A1* | 11/2007 | Watanabe | G06T 15/506 345/419 |
| 2008/0204579 | A1* | 8/2008 | Masuda | G06T 5/50 348/254 |

(Continued)

FOREIGN PATENT DOCUMENTS

| JP | 2005-267366 | 9/2005 |
| JP | 2006-279162 | 10/2006 |
| JP | 2012-156882 | 8/2012 |

OTHER PUBLICATIONS

Zheng, Yuanjie et al., "Single-Image Vignetting Correction", IEEE Transactions on Pattern Analysis and Machine Intelligence, IEEE Computer Society, vol. 31, No. 12, pp. 2243-2256, Dec. 31, 2009.

(Continued)

*Primary Examiner* — Ming Y Hon
(74) *Attorney, Agent, or Firm* — Fujitsu Patent Center (57) ABSTRACT

An image processing apparatus includes a memory and a processor coupled to the memory and the processor configured to obtain an image in which a subject is captured, calculate a modified luminance value of a first pixel included in the image by using a luminance value of the first pixel, luminance values of a plurality of pixels located in a surrounding region of the first pixel, and information indicating illumination intensity at each of the plurality of pixels; and correct the image in accordance with the modified luminance value of the first pixel.

18 Claims, 8 Drawing Sheets

(56) References Cited

U.S. PATENT DOCUMENTS

| | | | | |
|---|---|---|---|---|
| 2010/0046047 A1* | 2/2010 | Makino | ............. | H04N 1/00681 |
| | | | | 358/475 |
| 2010/0177203 A1* | 7/2010 | Lin | ................. | H04N 5/23229 |
| | | | | 348/222.1 |
| 2011/0150101 A1* | 6/2011 | Liu | ................. | H04N 13/239 |
| | | | | 375/240.26 |
| 2012/0032973 A1* | 2/2012 | Sano | ................ | G01J 3/504 |
| | | | | 345/593 |
| 2012/0188612 A1* | 7/2012 | Campanelli | ............ | H04N 1/403 |
| | | | | 358/3.22 |
| 2014/0016005 A1* | 1/2014 | Kishima | ............... | H04N 5/367 |
| | | | | 348/246 |
| 2017/0061592 A1* | 3/2017 | Reinhard | ............... | G06T 5/008 |
| 2017/0366801 A1* | 12/2017 | Horesh | ............... | H04N 13/296 |

OTHER PUBLICATIONS

Lyu, Siwei, "Estimating Vignetting Function from a Single Image for Image Authentication", MM&SEC '10, Proceedings of the 2010 ACM SIGMM Multimedia and Security Workshop, Rome, Italy, pp. 3-12, Sep. 9, 2010.

Kordecki, Andrzej et al., "Practical vignetting correction method for digital camera with measurement of surface luminance distribution", Signal, Image and Video Processing, vol. 10, No. 8, Springer, pp. 1417-1424, Jul. 21, 2016.

Extended European Search Report dated Dec. 7, 2018 for corresponding European Patent Application No. 18181891.5, 8 pages.

* cited by examiner

| X1 | X2 | X3 |
|---|---|---|
| X4 | X5(X0) | X6 |
| X7 | X8 | X9 |

801

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2017-137132, filed on Jul. 13, 2017, the entire contents of which are incorporated herein by reference.

FIELD

The embodiments discussed herein are related to image processing technology.

BACKGROUND

Figure 7:
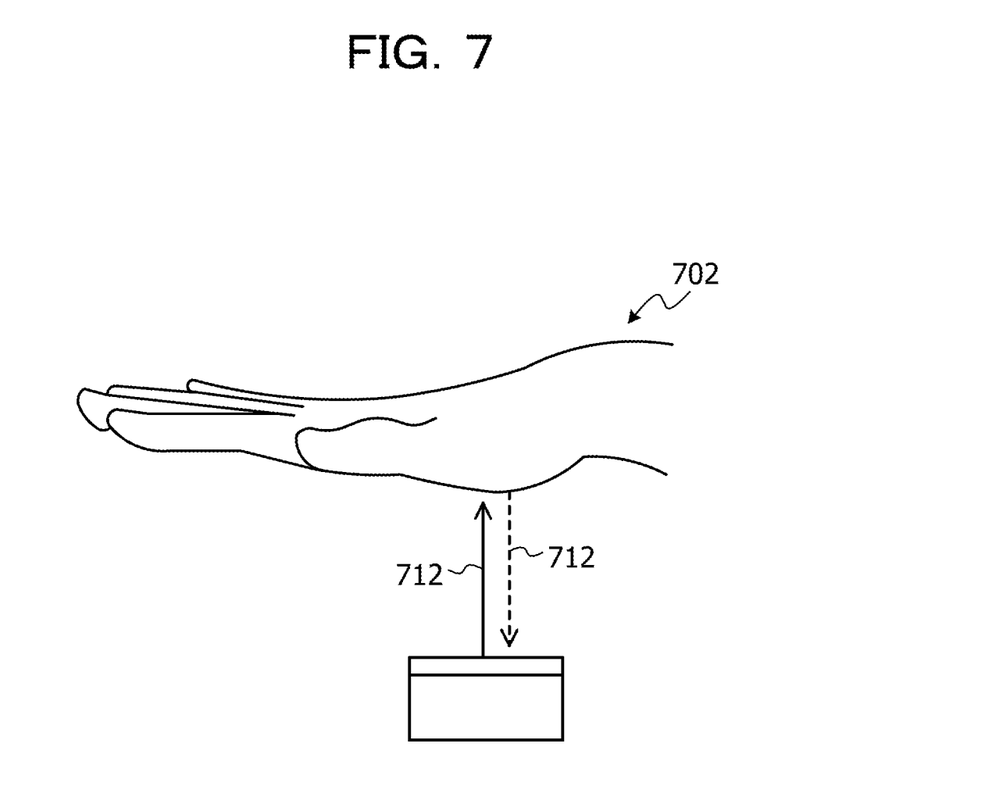
FIG. 7 is an illustration describing palm vein authentication.

Image authentication processing is used in various fields including biometric authentication. Palm vein authentication is an example of biometric authentication using image authentication processing. As depicted in FIG. 7, in palm vein authentication, a lighting device included in a vein sensor 701 illuminates a palm 702, which is a subject, with near-infrared light 711, and reflected light 712 from the subject is captured by an imaging device such as a complementary metal-oxide semiconductor (CMOS) image sensor or a charge-coupled device (CCD) image sensor included in the vein sensor 701 to provide a biometric image, which is used for authentication.

In biometric authentication, which uses a biometric image, features are extracted from a biometric image, and thus noise reduction in an image is important. In recent years, there has been an increasing demand for size reduction of a sensor that captures biometric images. In general, when a sensor that captures biometric images is reduced in size, an imaging device is also reduced in size, leading to a decrease in area per pixel. As a result, noise tends to increase due to a decrease in the amount of received light per pixel. For example, in biometric authentication, which uses a biometric image, an increase in noise in an image causes a decrease in authentication accuracy, worsening a false rejection rate or a false acceptance rate.

A Gaussian filter and a bilateral filter are known methods to reduce noise in an image. When the Gaussian filter and the bilateral filter reduce noise at a pixel of interest in an image, the noise is reduced based on luminance values of surrounding pixels located in the surrounding region of the pixel of interest. For example, the Gaussian filter is represented by Equation 1, and the bilateral filter is represented by Equation 2. Random noise (white noise) generated randomly in an image is averaged and reduced by performing a calculation involving the surrounding pixels by using the Gaussian filter or the bilateral filter.

[Math 1]

$$V(x_0) = \sum_{i=1}^{N} w(x_i - x_0) V_0(x_i) \quad \text{(Equation 1)}$$

$$V(x_0) = \sum_{i=1}^{N} w_1(x_i - x_0) w_2(V_0(x_i) - V_0(x_0)) V_0(x_i) \quad \text{(Equation 2)}$$

Figure 8:
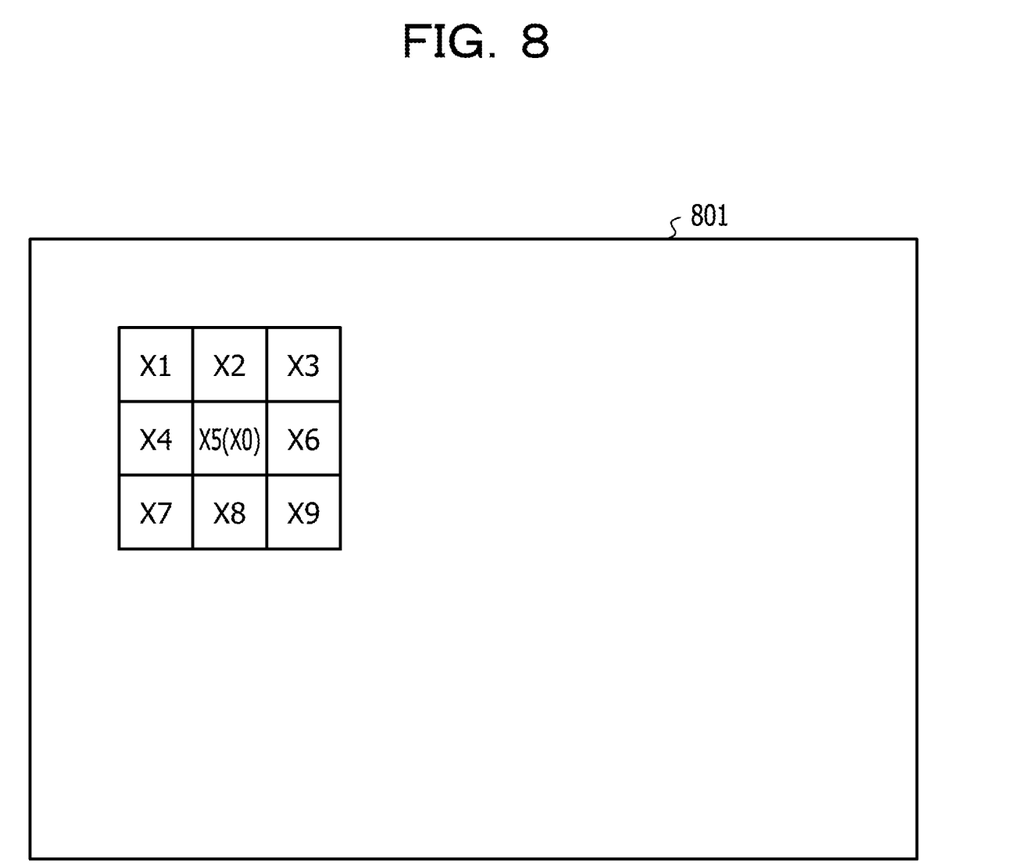
FIG. 8 is an illustration describing a noise reduction calculation.

In Equations 1 and 2, $V(x_0)$ is a luminance value of a pixel of interest after noise reduction processing is performed, and $V_0(x_i)$ is a measured value of luminance (measured luminance value) of a surrounding pixel. Here, $x_0$ represents coordinates of the pixel of interest, and $x_i$ represents coordinates of the surrounding pixel. The parameter i is an index that represents a pixel in a region (kernel) used for the noise reduction processing and takes an integer ranging from 1 to N. In Equations 1 and 2, w and $w_1$ are each a function (Gaussian function) that provides a weight based on a distance from the pixel of interest, and $w_2$ is a function that provides a weight based on a difference from a measured value of luminance at the pixel of interest. The number N is determined in accordance with the size of a kernel. For example, if the size of a kernel used for performing filtering processing on an image 801 is 3 pixels×3 pixels as depicted in FIG. 8, N equals 9. FIG. 8 is presented by way of example, and the size of a kernel used for performing filtering processing is not limited to this example.

In the Gaussian filter, a weight based on a distance from the pixel of interest is assigned to a measured value of luminance at each of the surrounding pixels. In the bilateral filter, a weight based on a distance from the pixel of interest and a weight based on a difference from the measured value of luminance at the pixel of interest are assigned to a measured value of luminance at each of the surrounding pixels. The weight based on the distance from the pixel of interest is increased as the distance decreases and decreased as the distance increases. The weight based on the difference from the measured value of luminance at the pixel of interest is increased as the difference from the measured value of luminance decreases and decreased as the difference from the measured value of luminance increases. This is based on an assumption that the true luminance value (luminance value subjected to no noise) of a surrounding pixel is closer to the true luminance value of the pixel of interest as the surrounding pixel is spatially closer to the pixel of interest or as the measured value of luminance at the surrounding pixel is closer to the measured value of luminance at the pixel of interest.

There is a proposed technique in which the degree of noise reduction for a target pixel for noise reduction is set based on a distance between the target pixel for noise reduction and a pixel corresponding to the center of a lens in an image, and noise reduction processing for the target pixel for noise reduction is performed in accordance with the degree of noise reduction set for the target pixel. There is a proposed technique for an image input method to convert a two-dimensional image into image data via photoelectric conversion, in which correction is performed so that a ratio of noise included in each piece of pixel data in image data is less dependent on the luminance level of the pixel. There is a proposed technique in which the center coordinates of shading for each color of color filters included in an imaging device are calculated, and shading correction coefficients in radial directions from the calculated center to the periphery of a screen for each color are calculated to perform shading correction of an image by using the center coordinates and the shading correction coefficients for each color.

For example, the techniques in the related art are disclosed in Japanese Laid-open Patent Publication No. 2005-267366, Japanese Laid-open Patent Publication No. 2006-279162, and Japanese Laid-open Patent Publication No. 2012-156882.

SUMMARY

According to an aspect of the invention, an image processing apparatus includes a memory and a processor coupled to the memory and the processor configured to obtain an image in which a subject is captured, calculate a modified luminance value of a first pixel included in the image by using a luminance value of the first pixel, luminance values of a plurality of pixels located in a surrounding region of the first pixel, and information indicating illumination intensity at each of the plurality of pixels; and correct the image in accordance with the modified luminance value of the first pixel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a sensor that captures biometric images for palm vein authentication illuminates a subject by using a lighting device installed in the sensor to capture a biometric image, illumination intensity is not uniform and changes, for example, depending on the distance from the center of the image. In general, the center of the image is bright, and positions closer to the periphery are darker. Thus, if two surrounding pixels located at the same distance from a pixel of interest in a biometric image are located at different distances from the center of the image, the reliability of a measured value of luminance is different for each of the two surrounding pixels, and weighting in accordance with a spatial distance from the pixel of interest and a difference from a measured value of luminance at the pixel of interest has insufficient accuracy.

Hereinafter, present embodiments will be described with reference to the drawings. In the present embodiments, a luminance value of each pixel in a biometric image is obtained by performing noise reduction processing on the biometric image captured by an apparatus that illuminates a subject by using a lighting device installed in the apparatus and calculating a luminance value of a pixel of interest by using measured values of luminance at the pixel of interest and a plurality of surrounding pixels located in the surrounding region of the pixel of interest. In the noise reduction processing, each pixel is weighted based on illumination intensity information of the lighting device illuminating the subject, in addition to a spatial distance from the pixel of interest in the captured biometric image and a difference from the measured value of luminance at the pixel of interest.

First Embodiment

A first embodiment will be described. In the following, a case where the image processing apparatus according to the present embodiment is applied to a biometric authentication apparatus will be described as an example. Examples of the biometric authentication apparatus include a palm vein authentication apparatus and a finger vein authentication apparatus which perform biometric authentication by using biometric images captured by illuminating a subject by using a lighting device.

Figure 1:
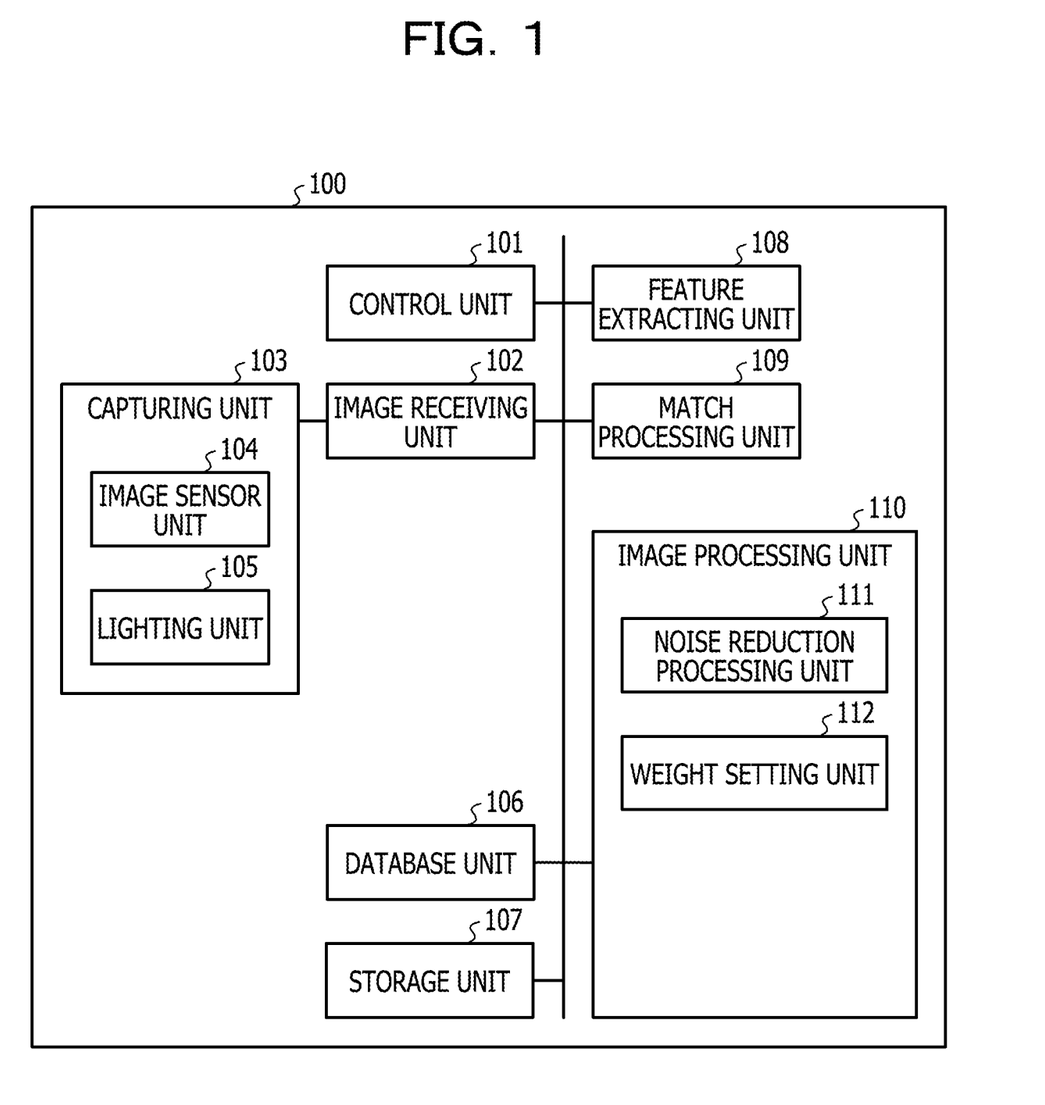
FIG. 1 is an illustration depicting an example configuration of an image processing apparatus according to a first embodiment.

FIG. 1 is an illustration depicting an example configuration of an image processing apparatus according to the first embodiment. An image processing apparatus 100 includes a control unit 101, an image receiving unit 102, a capturing unit 103, a database 106, a storage unit 107, a feature extracting unit 108, a match processing unit 109, and image processing unit 110. The control unit 101 controls the image processing apparatus 100 as a whole and controls individual functional units included in the image processing apparatus 100 in a coordinated manner. The image receiving unit 102 receives a biometric image obtained by capturing an image of a subject.

The capturing unit 103, which includes an image sensor unit 104 and a lighting unit 105, illuminates a subject, performs image capturing processing, and captures a biometric image. The image sensor unit 104 is a CMOS image sensor or a CCD image sensor, for example. The capturing unit 103 captures the biometric image of the subject by using the image sensor unit 104 while the lighting unit 105 illuminates the subject. For example, if the capturing unit 103 is a vein sensor, the lighting unit 105 illuminates a subject with near-infrared light, and reflected light from the subject is captured by the image sensor unit 104 to capture a biometric image. The capturing unit 103 outputs the captured biometric image to the image receiving unit 102. The capturing unit 103 may be disposed separately from the image processing apparatus 100, and a biometric image captured by the capturing unit 103 may be received by the image receiving unit 102 in the image processing apparatus 100.

The database 106 stores data used for biometric authentication, such as registered data (template) and identification (ID) information. The storage unit 107 is used as an image buffer or the like that retains biometric images. The database 106 is, for example, implemented by using a nonvolatile memory device such as a hard-disk drive (HDD), and the storage unit 107 is, for example, implemented by using a semiconductor memory used as a so-called working memory.

The feature extracting unit 108 extracts from a biometric image a biometric feature descriptor (feature data) to use for authentication. The match processing unit 109 performs processing to match collated data (input data) against registered data. The match processing unit 109 uses the biometric feature descriptor (feature data) extracted by the feature extracting unit 108 to compare features, calculates a similarity measure that represents the degree to which the registered data and the collated data (input data) resemble each other, and outputs the similarity measure.

The image processing unit 110 performs image processing such as noise reduction processing on the received biometric images. The image processing unit 110 includes a noise reduction processing unit 111 and a weight setting unit 112. The noise reduction processing unit 111 performs noise reduction processing on the biometric image by using a weight set by the weight setting unit 112, and thus the image processing unit 110 obtains a luminance value of each pixel in the biometric image, which is a luminance value after noise reduction processing is performed.

Noise reduction processing according to the first embodiment will be described. The noise reduction processing unit 111 in the image processing unit 110 uses measured values of luminance (measured luminance values) $V_0(x_i)$ of a pixel of interest at $x_0$, which is a target pixel for noise reduction in the received biometric image, and of a plurality of surrounding pixels at $x_i$ located in the surrounding region of the pixel of interest and calculates by using Equation 3 a luminance value $V(x_0)$ of the pixel of interest at $x_0$, which is a luminance value after noise reduction processing is performed. The parameter i is an index that represents a pixel in a region (kernel) used for the noise reduction processing and takes an integer ranging from 1 to size N of the kernel used for the noise reduction processing.

[Math 2]

$$V(x_0) = \sum_{i=1}^{N} w_1(x_i - x_0) w_2(V_0(x_i) - V_0(x_0)) w_3(r_i - r_0) V_0(x_i) \quad \text{(Equation 3)}$$

In Equation 3, $x_0$ represents coordinates of the pixel of interest in the biometric image, and $x_i$ represents coordinates of a surrounding pixel located in the surrounding region of the pixel of interest in the biometric image. Parameters $w_1$, $w_2$, and $w_3$ are weights set by the weight setting unit 112. The noise reduction processing unit 111 performs a calculation involving the surrounding pixels in accordance with Equation 3, and random noise (white noise) that is randomly generated in an image is averaged and reduced.

The weight $w_1$ is a weight that depends on a distance from the pixel of interest. The weight $w_1(x_i - x_0)$ that depends on a spatial distance between the pixel of interest at $x_0$ and a surrounding pixel at $x_i$ is given, for example, by Equation 4. In Equation 4, $x_0$ represents coordinates of the pixel of interest, $x_i$ represents coordinates of a surrounding pixel, and $\sigma_1$ is a fixed parameter that represents a degree of noise reduction that depends on the spatial distance. In addition, the denominator in Equation 4 represents a normalizing factor to normalize the weights so that the sum of the weights ($\Sigma w_1$) is 1.0.

[Math 3]

$$w_1(x_i - x_0) = \frac{\exp\left(-\frac{(x_i - x_0)^2}{2\sigma_1^2}\right)}{\sum_{i=1}^{N} \exp\left(-\frac{(x_i - x_0)^2}{2\sigma_1^2}\right)} \quad \text{(Equation 4)}$$

The weight $w_1$ depends on the spatial distance between the pixel of interest and a surrounding pixel. A larger value is set to the weight $w_1$ as the spatial distance between the pixel of interest and a surrounding pixel decreases, and a smaller value is set to the weight $w_1$ as the spatial distance between the pixel of interest and a surrounding pixel increases.

The weight $w_2$ is a weight that depends on a difference from a measured value of luminance at the pixel of interest. The weight $w_2(V_0(x_i) - V_0(x_0))$, which depends on a difference between the measured value of luminance at the pixel of interest $V_0(x_0)$ and the measured value of luminance at a surrounding pixel $V_0(x_i)$, is given, for example, by Equation 5. In Equation 5, $\sigma_2$ is a fixed parameter that represents a degree of noise reduction that depends on the difference between the measured values of luminance, and the denominator represents a normalizing factor to normalize the weights so that the sum of the weights ($\Sigma w_2$) is 1.0.

[Math 4]

$$w_2(V_0(x_i) - V_0(x_0)) = \frac{\exp\left(-\frac{(V_0(x_i) - V_0(x_0))^2}{2\sigma_2^2}\right)}{\sum_{i=1}^{N} \exp\left(-\frac{(V_0(x_i) - V_0(x_0))^2}{2\sigma_2^2}\right)} \quad \text{(Equation 5)}$$

The weight $w_2$ depends on the difference between the measured value of luminance at the pixel of interest and the measured value of luminance at a surrounding pixel. A larger value is set to the weight $w_2$ as the difference between the measured value of luminance at the pixel of interest and the measured value of luminance at a surrounding pixel decreases, and a smaller value is set to the weight $w_2$ as the difference between the measured value of luminance at the pixel of interest and the measured value of luminance at a surrounding pixel increases. The weights $w_1$ and $w_2$ are terms corresponding to a bilateral filter.

The weight $w_3$ is a weight based on illumination intensity information of a lighting device, and in this embodiment, the weight $w_3$ depends on a difference between distances from the center of an image. For example, in a biometric image captured by a vein sensor, which illuminates a subject by using a lighting device installed in the vein sensor, luminance typically decreases from the center to the periphery of the image. This decrease is caused by an illumination intensity distribution. A region having the same illumination intensity is considered to form a concentric pattern around the center of the image, and thus true luminance values (luminance values subjected to no noise) are likely to be close to each other at positions located at the same distance from the center of the image while true luminance values are likely to be different from each other at positions located at different distances from the center of the image. In short, luminance values at two positions are considered to correlate more closely as the difference between the distances from the center of the image to the two positions decreases.

Figure 2:
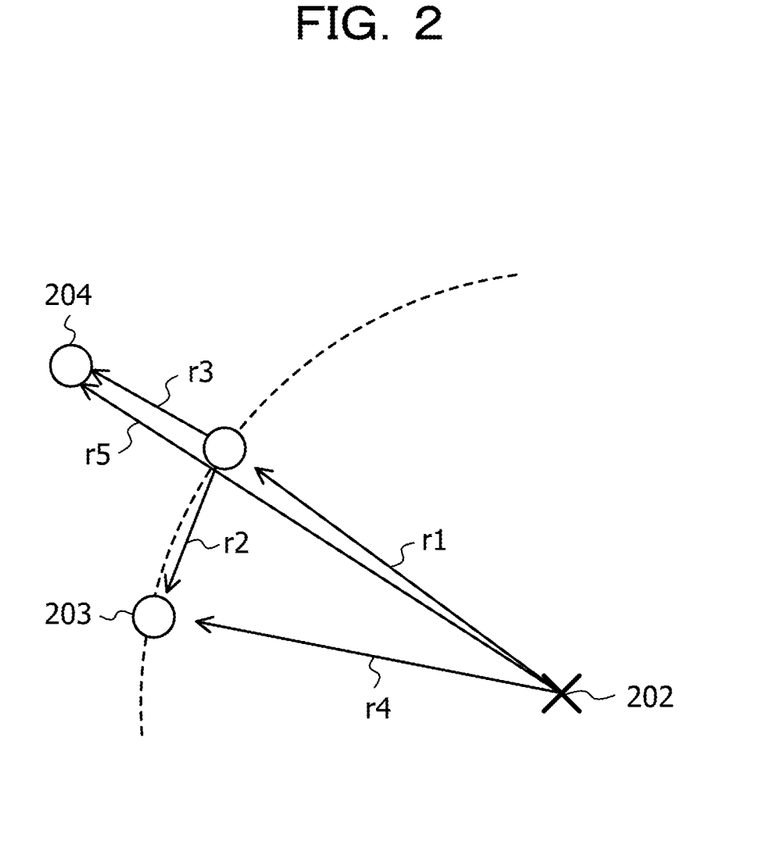
FIG. 2 is a diagram illustrating weight setting according to the first embodiment.

Thus, for a pixel located at a distance from the center of the image, the distance being close to the distance between the center of the image and the pixel of interest, the weight $w_3$ is set to a large value because the illumination intensity at the pixel is considered to be close to the illumination intensity at the pixel of interest. As the difference between the distances from the center of the image to a pixel and to the pixel of interest increases, the difference between the illumination intensity at the pixel and the illumination intensity at the pixel of interest is considered to increase, and the weight $w_3$ is set to a smaller value. In an example depicted in FIG. 2, the distance from the center of an image 202 to the pixel of interest 201 at $x_0$ is denoted by r1. The distance from the center of the image 202 to a neighboring pixel A 203, which is located at a distance of r2 from the pixel of interest 201 at $x_0$, is denoted by r4, and the distance from the center of the image 202 to a neighboring pixel B 204, which is located at a distance of r3 from the pixel of interest 201 at $x_0$, is denoted by r5. If the distance r2 and the distance r3 are equal but the difference between the distance r1 and the distance r4 is smaller than the difference between the distance r1 and the distance r5, the weight $w_3$ for the neighboring pixel A 203 is set to a larger value than the weight $w_3$ for the neighboring pixel B 204.

The weight $w_3(r_i-r_0)$, which depends on the difference between the distances from the center of the image to the pixel of interest and to a surrounding pixel, is given, for example, by Equation 6. The center of the image is located, for example, at a position (320, 240) for an image constituted by 640×480 pixels. In Equation 6, $r_0$ represents a distance from the center of the image to the pixel of interest, $r_i$ represents a distance from the center of the image to a surrounding pixel, and $\sigma_3$ is a fixed parameter that represents a degree of noise reduction that depends on the difference between the distances from the center of the image. In addition, the denominator in Equation 6 represents a normalizing factor to normalize the weights so that the sum of the weights ($\Sigma w_3$) is 1.0.

[Math 5]

$$w_3(r_i - r_0) = \frac{\exp\left(-\frac{(r_i - r_0)^2}{2\sigma_3^2}\right)}{\sum_{i=1}^{N} \exp\left(-\frac{(r_i - r_0)^2}{2\sigma_3^2}\right)} \quad \text{(Equation 6)}$$

The weight $w_3$ depends on the difference between the distances from the center of the image to the pixel of interest and to a surrounding pixel. A larger value is set to the weight $w_3$ as the difference between the distances from the center of the image decreases, and a smaller value is set to the weight $w_3$ as the difference between the distances from the center of the image increases. Based on the weight $w_3$, which depends on the difference between the distances from the center of the image, noise reduction processing in which a pixel located at a distance from the center of the image, the distance being close to the distance between the center of the image and the pixel of interest, is weighted more is realized. In summary, a weight for a pixel under the same illumination condition (illumination intensity), which is located at the same distance from the center of the image, is increased, and a weight for a pixel under a different illumination condition (illumination intensity) is decreased. As a result, noise reduction accuracy is increased, and luminance values of pixels are accurately obtained.

Figure 3:
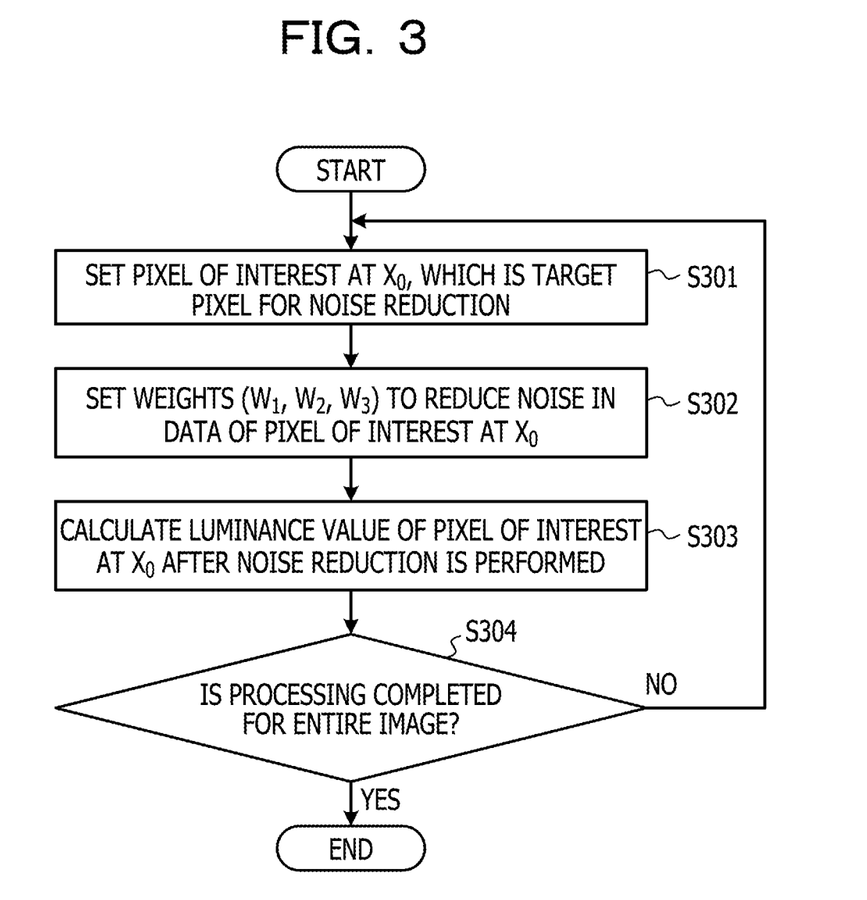
FIG. 3 is a flowchart depicting example noise reduction processing according to the first embodiment.

FIG. 3 is a flowchart depicting example noise reduction processing according to the first embodiment. When the noise reduction processing is started, in step S301, the image processing unit 110 sets a pixel of interest, located at $x_0$, which is a target pixel for noise reduction in a biometric image to be processed. Then, in step S302, the weight setting unit 112 in the image processing unit 110 sets weights $w_1$, $w_2$, and $w_3$, which are used for reducing noise in the data of the pixel of interest located at $x_0$, which is set in step S301. As described above, the weight setting unit 112 sets the weight $w_1$ in accordance with a distance from the pixel of interest, sets the weight $w_2$ in accordance with a difference from a measured value of luminance at the pixel of interest, and sets the weight $w_3$ in accordance with a difference between distances from the center of the image.

Next, in step S303, the noise reduction processing unit 111 in the image processing unit 110 uses the weights $w_1$, $w_2$, and $w_3$, which are set in step S302, and calculates a luminance value $V(x_0)$, which is a luminance value after noise reduction processing is performed, of the pixel of interest at $x_0$, which is set in step S301, from measured values of luminance $V_0(x_i)$ of surrounding pixels at $x_i$. The noise reduction processing unit 111 uses measured values of luminance $V_0(x_i)$ of surrounding pixels at $x_i$ and the weights $w_1$, $w_2$, and $w_3$, which are set, performs the calculation described in Equation 3, and calculates a luminance value $V(x_0)$ of the pixel of interest at $x_0$, which is a luminance value after noise reduction processing is performed.

Next, in step S304, the image processing unit 110 determines whether the processing is completed for the entire biometric image, that is, for all of the pixels in the biometric image. When it is determined that at least one unprocessed pixel is present (NO), the process returns to step S301, and the image processing unit 110 sets a pixel of interest, located at $x_0$, which is a target pixel for noise reduction among the unprocessed pixels in the biometric image and performs the processing described above. In contrast, when it is determined that no unprocessed pixels are present, that is, the processing is complete for the entire biometric image (YES), the image processing unit 110 terminates the noise reduction processing.

According to the first embodiment, in addition to the weight $w_1$, which depends on the spatial distance from the pixel of interest, which is a pixel in the biometric image to be processed, and the weight $w_2$, which depends on the difference from the measured value of luminance at the pixel of interest, the weight $w_3$, which depends on the difference between the distances from the center of the image, is used to weight the pixels, and the noise reduction processing is performed. Consequently, a weight for a pixel under the same illumination condition (illumination intensity) is increased, and a weight for a pixel under a different illumination condition (illumination intensity) is decreased. Thus, noise reduction accuracy is increased, and luminance values of pixels are accurately obtained.

For example, if the capturing unit 103, such as a sensor, is reduced in size, illuminating a subject uniformly by using the lighting unit 105 becomes difficult, and nonuniformity in an illumination distribution increases. However, weighting based on illumination intensity information enables accurate noise reduction processing, and luminance values of pixels in a biometric image are accurately obtained. In short, the present embodiment is effective as a method to reduce noise of a sensor or the like reduced in size. In the above description, weighting based on a difference between distances from the center of the image is performed on the assumption that the center of illumination intensity distribution is located at the center of the image. However, if the center of illumination intensity distribution is not located at the center of the image, the center of illumination intensity distribution may be defined as a reference position, and weighting based on a difference between distances from the reference position may be performed.

Second Embodiment

Next, a second embodiment will be described. In the following, a case where the image processing apparatus according to the present embodiment is applied to a biometric authentication apparatus will be described as an example. Examples of the biometric authentication apparatus include a palm vein authentication apparatus and a finger vein authentication apparatus which perform biometric authentication by using biometric images captured by illuminating a subject by using a lighting device. In the first embodiment described above, the weight $w_3$, which is based on the illumination intensity information of the lighting device, is set to a weight based on the difference between the distances from the center of an image. In the second embodiment, the weight $w_3$, which is based on the illumination intensity information of the lighting device, is set to a weight based on information on illumination intensity distribution of the lighting unit 105, which is installed in the capturing unit 103.

Figure 4:
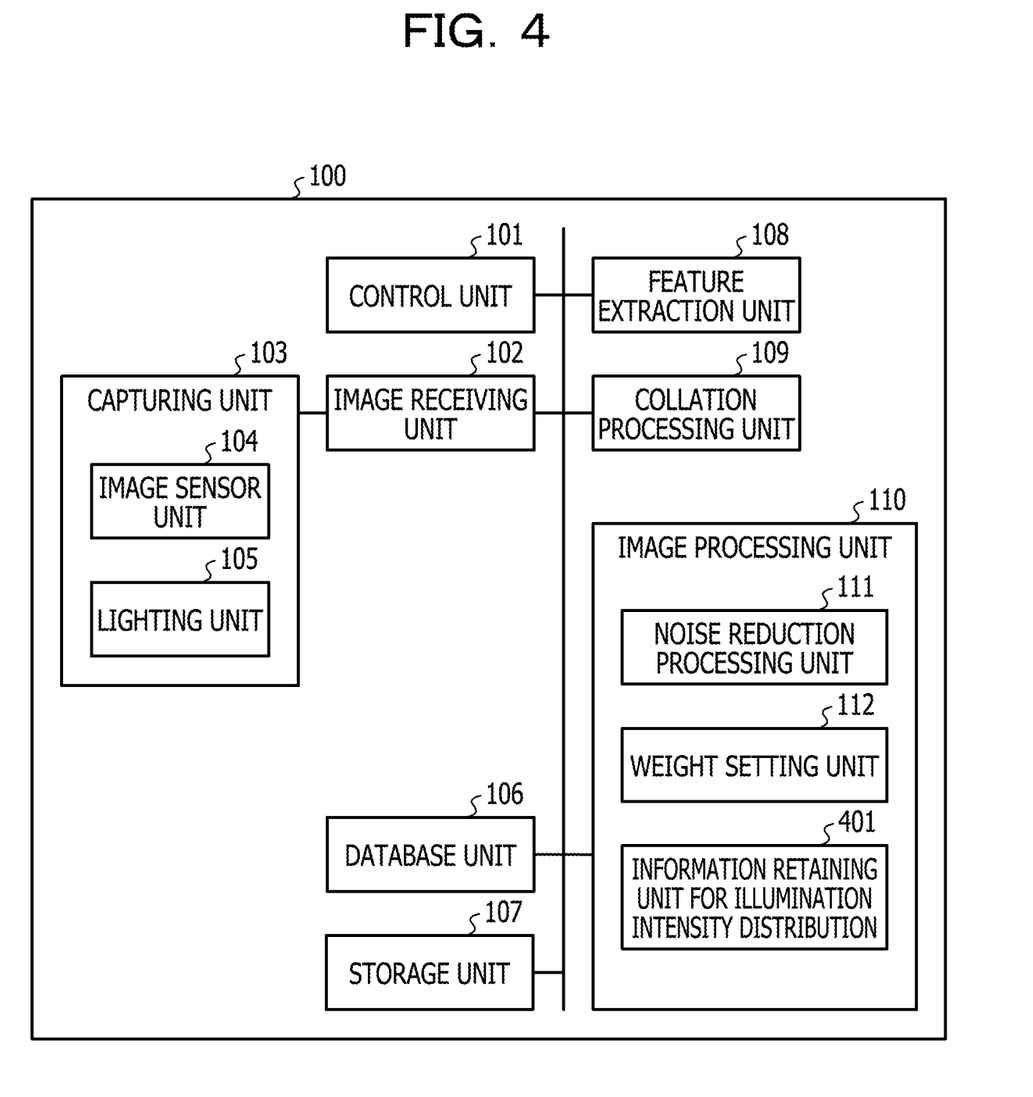
FIG. 4 is an illustration depicting an example configuration of the image processing apparatus according to a second embodiment.

FIG. 4 is an illustration depicting an example configuration of the image processing apparatus according to the second embodiment. In FIG. 4, a block having the same function as a block depicted in FIG. 1 is denoted by the same reference numeral and is not repeatedly described herein. The image processing unit 110 in the image processing apparatus 100 according to the second embodiment includes the noise reduction processing unit 111, the weight setting unit 112, and an information retaining unit for illumination intensity distribution 401.

The information retaining unit for illumination intensity distribution 401 retains information on illumination intensity distribution of the lighting unit 105, which is installed in the capturing unit 103. The information retaining unit for illumination intensity distribution 401 is an example of an information retaining unit. Specifically, the information retaining unit for illumination intensity distribution 401 retains a luminance value $L(x)$ at a position x in an image. The information on the illumination intensity distribution is obtained in advance and retained. When the information on the illumination intensity distribution is obtained, it is desirable to use a predetermined object such as a standard reflector as a subject so that stable reflected light is captured as a reference irrespective of characteristics of a subject to obtain the information on the illumination intensity distribution. The weight setting unit 112 uses the information on the illumination intensity distribution retained by the information retaining unit for illumination intensity distribution 401 and sets weights $w_3$, which is based on the illumination intensity information of the lighting device.

In the second embodiment, the noise reduction processing unit 111 uses measured values of luminance (measured luminance values) $V_0(x_i)$ of a pixel of interest at $x_0$, which is a target pixel for noise reduction in the received biometric image, and of surrounding pixels at $x_i$ located in the surrounding region of the pixel of interest and calculates by using Equation 7 a luminance value $V(x_0)$ of the pixel of interest at $x_0$, which is a luminance value after noise reduction processing is performed.

[Math 6]

$$V(x_0) = \sum_{i=1}^{N} w_1(x_i - x_0) w_2(V_0(x_i) - V_0(x_0)) w_3(L(x_i) - L(x_0)) V_0(x_i) \quad \text{(Equation 7)}$$

In Equation 7, $x_0$ represents coordinates of the pixel of interest in the biometric image, and $x_i$ represents coordinates of a surrounding pixel located in the surrounding region of the pixel of interest in the biometric image. Parameters $w_1$, $w_2$, and $w_3$ are weights set by the weight setting unit 112. The noise reduction processing unit 111 performs a calculation involving the surrounding pixels in accordance with Equation 7, and random noise (white noise) that is randomly generated in an image is averaged and reduced.

The weight $w_1$ is a weight that depends on a distance from the pixel of interest and is given, for example, by Equation 4 in the same manner as in the first embodiment. The weight $w_2$ is a weight that depends on a difference from a measured value of luminance at the pixel of interest and is given, for example, by Equation 5 in the same manner as in the first embodiment.

The weight $w_3$ is a weight based on illumination intensity information of a lighting device and, in this embodiment, is given based on the information on the illumination intensity distribution retained by the information retaining unit for illumination intensity distribution 401. The weight $w_3(L(x_i)-L(x_0))$, which is based on the information on the illumination intensity distribution, is given, for example, by Equation 8. In Equation 8, $L(x_0)$ represents an illumination intensity (luminance value) at the position of the pixel of interest retained in the information on the illumination intensity distribution, $L(x_i)$ represents an illumination intensity (luminance value) at a position of a surrounding pixel retained in the information on the illumination intensity distribution, and $\sigma_3$ is a fixed parameter that represents a degree of noise reduction that depends on the illumination intensity distribution. In addition, the denominator in Equation 8 represents a normalizing factor to normalize the weights so that the sum of the weights ($\Sigma w_3$) is 1.0.

[Math 7]

$$w_3(L(x_i) - L(x_0)) = \frac{\exp\left(-\frac{(L(x_i) - L(x_0))^2}{2\sigma_3^2}\right)}{\sum_{i=1}^{N} \exp\left(-\frac{(L(x_i) - L(x_0))^2}{2\sigma_3^2}\right)} \quad \text{(Equation 8)}$$

The weight $w_3$ depends on the illumination intensity distribution at positions of the pixel of interest and a surrounding pixel. A larger value is set to the weight $w_3$ as the difference between the illumination intensity at the position of the pixel of interest and the illumination intensity at the position of a surrounding pixel retained in the information on the illumination intensity distribution decreases, and a smaller value is set to the weight $w_3$ as the difference between the illumination intensity at the position of the pixel of interest and the illumination intensity at the position of a surrounding pixel increases. The weight $w_3$, which is based on the illumination intensity distribution, enables noise reduction processing that uses the illumination intensity distribution. In this way, even if the illumination intensity does not distribute concentrically, noise reduction accuracy is increased, and luminance values of pixels are accurately obtained. For a plurality of capturing units 103, the information on the illumination intensity distribution retained by the information retaining unit for illumination intensity distribution 401 may be obtained and retained for each type of the plurality of capturing units 103 in the image processing apparatus 100 or may be obtained and retained for each of the plurality of capturing units 103. Each of the plurality of capturing units 103 means a capturing unit in each product. Even if the illumination intensity distributes concentrically in design, actual distributions may deviate from the distribution in design due to individual differences of products. In such a case, retaining distribution information specific to individual capturing units enables accurate noise reduction processing.

Figure 5:
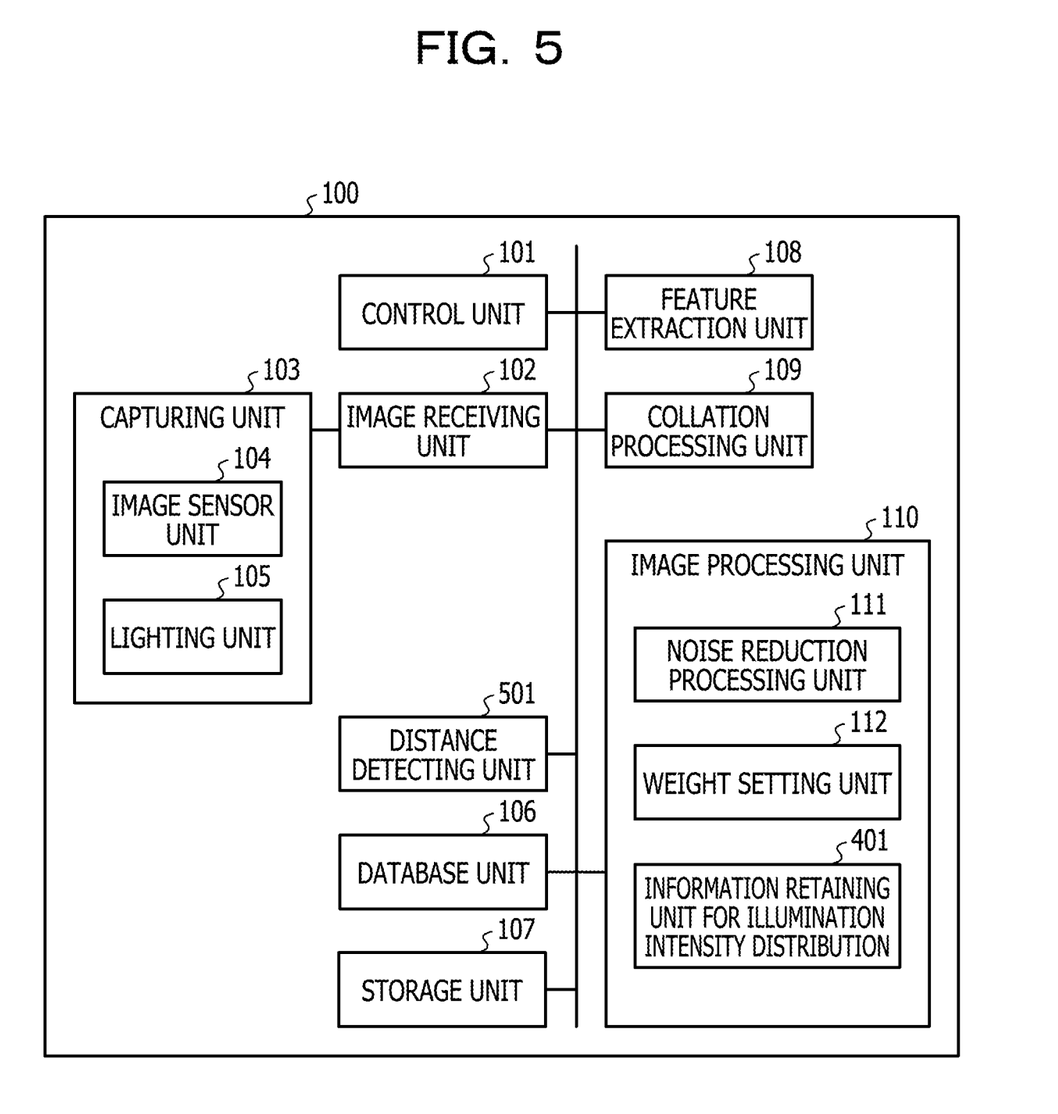
FIG. 5 is an illustration depicting another example configuration of the image processing apparatus according to the second embodiment.

The illumination intensity distribution may vary depending on the distance to a subject. In such a case, as depicted in FIG. 5, a distance detecting unit 501 may be installed, and a plurality of sets of information on illumination intensity distribution, each of which corresponds to a different distance, may be obtained in advance and retained by the information retaining unit for illumination intensity distribution 401. Then, one of the sets of information on illumination intensity distribution may be used in accordance with the distance detected by the distance detecting unit 501. In accordance with the distance detected by the distance detecting unit 501, interpolation may be performed using the plurality of sets of information on illumination intensity distribution, and the illumination intensities at positions of the pixel of interest and the surrounding pixels may be obtained.

The image processing apparatus according to the embodiments described above may be realized, for example, by a computer that executes programs. A computer-readable recording medium recording such programs is also appropriate as an embodiment. Examples of such a recording medium that is usable include a flexible disc, a hard disk, an optical disc, a magneto-optical disc, a compact disc read-only memory (CD-ROM), a magnetic tape, a nonvolatile memory card, and a read-only memory (ROM).

A program product that causes a computer to execute and process programs and that realizes the functions in the embodiments described above is also appropriate as an embodiment. Examples of such a program product include the programs themselves that realize the functions in the embodiments described above and a computer that has read the programs. Other examples of such a program product include a transmission apparatus capable of providing the programs to a computer communicatively connected via a network and a network system equipped with such a transmission apparatus.

When the functions in the embodiments described above are realized by provided programs in combination with an operating system (OS), other application, or the like operating on a computer, such programs are also appropriate as an embodiment. When the functions in the embodiments described above are realized by a system extension unit of a computer executing all or part of the processing of the provided programs, such programs are also appropriate as an embodiment. All or some of the programs may be executed on another computer to use the embodiments in a network environment.

Figure 6:
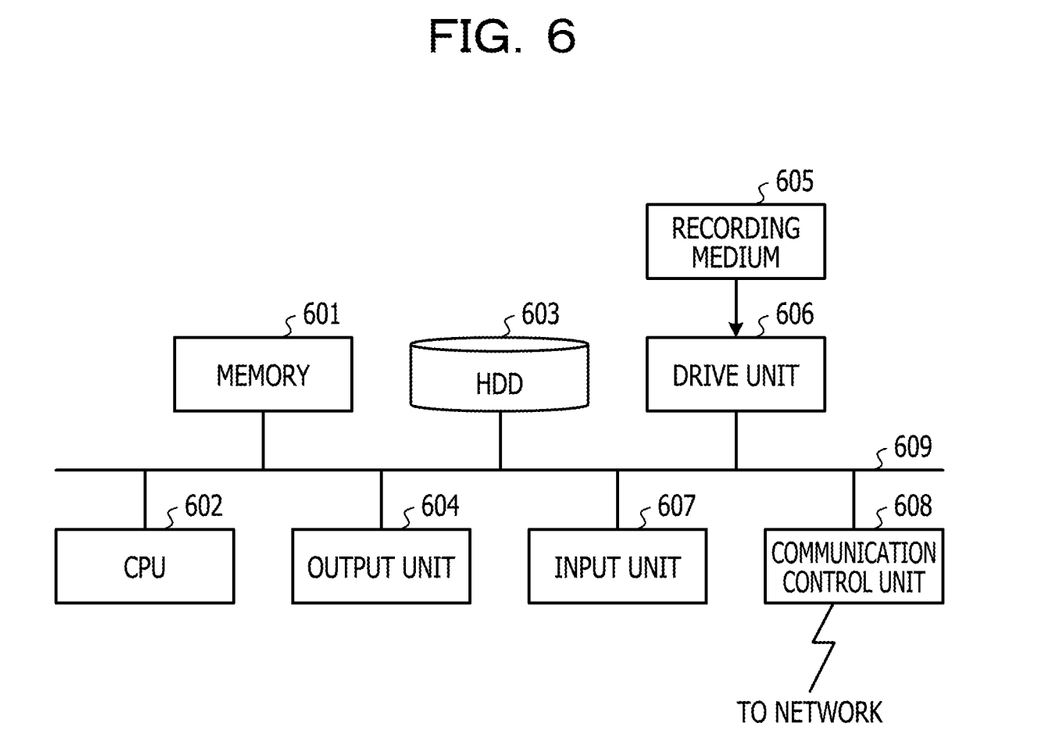
FIG. 6 is a functional block diagram of a computer capable of realizing the image processing apparatus according to the present embodiments.

The image processing apparatus according to the embodiments described above may be realized, for example, by a computer depicted in FIG. 6. In the computer depicted in FIG. 6, a memory 601, a central processing unit (CPU) 602, an HDD 603, an output unit 604, a drive unit 606 for a recording medium 605, an input unit 607, and a communication control unit 608 for connection to a network are connected to each other via a bus 609. The OS and application programs to execute the processing in the embodiments described above are stored in the HDD 603 and read into the memory 601 from the HDD 603 when executed by the CPU 602. The CPU 602 controls the output unit 604, the drive unit 606, the communication control unit 608, and other units to execute predetermined operations in accordance with processing described in the application programs. During the processing, data is stored mainly in the memory 601. Alternatively, the data may be stored in the HDD 603. In this example, the application programs to execute the processing described above are stored, for example, in the recording medium 605, which is computer readable and portable, distributed, and installed in the HDD 603 from the drive unit 606. The application programs may be installed in the HDD 603 via a network such as the Internet and the communication control unit 608. In such a computer, the various functions in the embodiments described above are realized by hardware such as the CPU 602 and the memory 601 working in coordination with software such as the OS and the application programs.

All of the embodiments are described only by way of example for execution and realization and are not considered to limit the technical scope. In other words, execution in various forms is possible without departing from the technical scope and major features.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   a memory; and
   a processor coupled to the memory and the processor configured to obtain an image in which a subject is captured,
   identify a distance from a first pixel included in the image to a plurality of pixels located in a surrounding region of the first pixel;
   identify a difference of a luminance between a luminance of the first pixel and a luminance of the plurality of pixels;
   identify an intensity of a luminance which changes according to a distance from the first pixel;
   calculate a modified luminance value of the first pixel included in the image by using the identified distance, the identified difference of a luminance, and the identified intensity of a luminance; and
   correct the image in accordance with the modified luminance value of the first pixel.

2. The image processing apparatus according to claim 1, wherein the information is determined on the basis of a difference between a distance from the center of the image to the first pixel and each distance from the center of the image to each of the plurality of pixels.

3. The image processing apparatus according to claim 1, further comprising:
   a lighting unit that illuminates the subject to be captured in the image; and
   a capturing unit that produces the image.

4. The image processing apparatus according to claim 1, wherein
   the processor is further configured to
   obtain another image, and
   determine an illumination intensity distribution in accordance with the other image wherein the information is determined on the basis of the illumination intensity distribution.

5. The image processing apparatus according to claim 4, further comprising a distance detecting unit that detects a distance to the subject,
wherein the information is determined on the basis of interpolation for the illumination intensity distribution based on a first distance detected by the distance detecting unit.

6. The image processing apparatus according to claim 4, further comprising a distance detecting unit that detects a distance to the subject,
wherein the processor is further configured to store, in the memory, a plurality of illumination intensity distributions in association with each distance, and
wherein the information is determined on the basis of a first illumination intensity distribution associated with a first distance detected by the distance detecting unit.

7. An image processing method comprising:
obtaining an image in which a subject is captured;
identifying a distance from a first pixel included in the image to a plurality of pixels located in a surrounding region of the first pixel;
identifying a difference of a luminance between a luminance of the first pixel and a luminance of the plurality of pixels;
identifying an intensity of a luminance which changes according to a distance from the first pixel;
calculating a modified luminance value of the first pixel included in the image by using the identified distance, the identified difference of a luminance, and the identified intensity of a luminance; and
correct the image in accordance with the modified luminance value of the first pixel.

8. The image processing method according to claim 7, wherein the information is determined on the basis of a difference between a distance from the center of the image to the first pixel and each distance from the center of the image to each of the plurality of pixels.

9. The image processing method according to claim 7, further comprising, prior to the obtaining:
illuminating the subject to be captured in the image; and
capturing the image.

10. The image processing method according to claim 7, further comprising:
obtaining another image; and
determining an illumination intensity distribution in accordance with the other image
wherein the information is determined on the basis of the illumination intensity distribution.

11. The image processing method according to claim 10, further comprising detecting a distance to the subject
wherein the information is determined on the basis of interpolation for the illumination intensity distribution based on the detected distance.

12. The image processing method according to claim 10, further comprising:
detecting a distance to the subject, and
referring to a memory storing a plurality of illumination intensity distributions in association with each distance
wherein the information is determined on the basis of a first illumination intensity distribution associated with the detected distance.

13. A non-transitory computer-readable medium storing an image processing program that causes a computer to execute a process comprising:
obtaining an image in which a subject is captured;
identifying a distance from a first pixel included in the image to a plurality of pixels located in a surrounding region of the first pixel;
identifying a difference of a luminance between a luminance of the first pixel and a luminance of the plurality of pixels;
identifying an intensity of a luminance which changes according to a distance from the first pixel;
calculating a modified luminance value of a first pixel included in the image by using the identified distance, the identified difference of a luminance, and the identified intensity of a luminance; and
correct the image in accordance with the modified luminance value of the first pixel.

14. The medium according to claim 13, wherein the information is determined on the basis of a difference between a distance from the center of the image to the first pixel and each distance from the center of the image to each of the plurality of pixels.

15. The medium according to claim 13, the process further comprising, prior to the obtaining:
illuminating the subject to be captured in the image; and
capturing the image.

16. The medium according to claim 13, the process further comprising:
obtaining another image; and
determining an illumination intensity distribution in accordance with the other image
wherein the information is determined on the basis of the illumination intensity distribution.

17. The medium according to claim 16, the process further comprising detecting a distance to the subject
wherein the information is determined on the basis of interpolation for the illumination intensity distribution based on the detected distance.

18. The medium according to claim 16, the process further comprising:
detecting a distance to the subject, and
referring to a memory storing a plurality of illumination intensity distributions in association with each distance
wherein the information is determined on the basis of a first illumination intensity distribution associated with the detected distance.

* * * * *